United States Patent
Dlhopolsky et al.

(10) Patent No.: US 12,524,748 B2
(45) Date of Patent: Jan. 13, 2026

(54) AUTHORIZING USAGE OF MEDIA CONTENT OF A CONTENT OWNER BY OTHER CONTENT CREATORS

(71) Applicant: Google LLC, Mountain View, CA (US)

(72) Inventors: Henry Scott Dlhopolsky, Zürich (CH); David Griesbach, Pacifica, CA (US)

(73) Assignee: Google LLC, Mountain View, CA (US)

( * ) Notice: Subject to any disclaimer, the term of this patent is extended or adjusted under 35 U.S.C. 154(b) by 336 days.

(21) Appl. No.: 18/105,540

(22) Filed: Feb. 3, 2023

(65) Prior Publication Data
US 2024/0265067 A1  Aug. 8, 2024

(51) Int. Cl.
| | |
|---|---|
| G06Q 20/12 | (2012.01) |
| G06F 16/955 | (2019.01) |
| G06F 21/10 | (2013.01) |

(52) U.S. Cl.
CPC ....... *G06Q 20/1235* (2013.01); *G06F 16/955* (2019.01); *G06F 21/1014* (2023.08); *G06F 21/1078* (2023.08); *G06F 21/108* (2023.08)

(58) Field of Classification Search
CPC ...... G06Q 20/12; G06Q 20/14; G06Q 20/145; G06Q 20/1235; G06Q 30/018; G06Q 30/184; G06Q 30/0601; G06Q 30/0607; G06Q 30/0645; G06F 16/955;
(Continued)

(56) References Cited

U.S. PATENT DOCUMENTS

| | | | | |
|---|---|---|---|---|
| 6,253,193 | B1 * | 6/2001 | Ginter | G06Q 10/087 |
| | | | | 705/52 |
| 7,925,973 | B2 * | 4/2011 | Allaire | H04N 21/2547 |
| | | | | 715/201 |

(Continued)

FOREIGN PATENT DOCUMENTS

| | | |
|---|---|---|
| TW | I371722 B | 9/2012 |
| TW | M527131 U | 8/2016 |
| WO | 2023287969 A1 | 1/2023 |

OTHER PUBLICATIONS

Gomaa, Ahmed, "A DRM Solution for Online Content Using Blockchain—A Music Perspective," Dec. 27, 2018, 17 pages. Available at SSRN: https://ssrn.com/abstract=3351542 or http://dx.doi.org/10.2139/ssrn.3351542.

(Continued)

*Primary Examiner* — James N Fiorillo
(74) *Attorney, Agent, or Firm* — Lowenstein Sandler LLP (57) ABSTRACT

A method includes generating a first media item identifier for a first media item of a first media item owner, the first media item being associated with one or more media usage options. The method further includes generating, for each of the one or more media usage options, a media usage option identifier. The method further includes receiving a media usage request of a second media item owner. The method further includes, upon determining that the media usage request satisfies one or more criteria pertaining to the selected media usage option, generating a media usage token. The method further includes transmitting the media usage token to a user device of the second media item owner to authorize the second media item owner to include at least a portion of the first media item in a second media item of the second media item owner.

17 Claims, 6 Drawing Sheets

(58) Field of Classification Search
CPC .... G06F 21/10; G06F 21/108; G06F 21/1014; G06F 21/1078
USPC .......................................................... 726/26
See application file for complete search history.

(56) References Cited

U.S. PATENT DOCUMENTS

| | | | | |
|---|---|---|---|---|
| 8,645,229 | B1* | 2/2014 | Buchheit | G06Q 30/0635 |
| | | | | 705/26.1 |
| 8,676,713 | B2* | 3/2014 | Bucher | G06F 21/62 |
| | | | | 705/52 |
| 2006/0062426 | A1* | 3/2006 | Levy | H04N 21/2543 |
| | | | | 348/E7.071 |
| 2006/0167804 | A1* | 7/2006 | Aydar | G06Q 20/123 |
| | | | | 705/51 |
| 2007/0083497 | A1* | 4/2007 | Martinez | G06Q 30/06 |
| 2008/0141378 | A1* | 6/2008 | Mclean | G06F 21/10 |
| | | | | 726/26 |
| 2009/0259564 | A1* | 10/2009 | Barkerding | G06Q 20/12 |
| | | | | 705/26.1 |
| 2014/0067516 | A1* | 3/2014 | Price | G06Q 30/0256 |
| | | | | 705/14.39 |
| 2015/0170157 | A1* | 6/2015 | Moore | G06Q 30/018 |
| | | | | 705/310 |
| 2017/0206570 | A1* | 7/2017 | Price | G06F 21/10 |
| 2021/0035246 | A1* | 2/2021 | Schouppe | H04L 9/50 |
| 2021/0166203 | A1* | 6/2021 | Code | H04L 63/0861 |
| 2022/0383282 | A1* | 12/2022 | Apollo | G06Q 20/1235 |
| 2022/0407702 | A1* | 12/2022 | Jakobsson | H04L 9/50 |
| 2023/0222187 | A1* | 7/2023 | Goldston | G06F 16/686 |
| | | | | 726/28 |

OTHER PUBLICATIONS

International Search Report and Written Opinion for International Application No. PCT/US2024/014336, mailed Apr. 17, 2024, 15 Pages.

* cited by examiner

AUTHORIZING USAGE OF MEDIA CONTENT OF A CONTENT OWNER BY OTHER CONTENT CREATORS

TECHNICAL FIELD

Aspects and implementations of the present disclosure relate to methods and systems for authorizing usage of media content of a content owner by other content creators.

BACKGROUND

A first content creator may want to include in his/her generated media item one or more media items that have been produced by a second content creator. The first content creator may need permission from the second content creator to incorporate the second content creator's media item(s) into the generated media item. Negotiating a media usage agreement from the second content creator can be costly and cumbersome.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Systems and method are disclosed for authorizing media usage agreements between content creators. In some embodiments, a method includes generating a first media item identifier for a first media item of a first media item owner. The first media item is associated with one or more media usage options provided by the first media item owner. The method further includes generating, for each of the one or more media usage options, a media usage option identifier. The method further includes storing the first media item identifier and the one or more media usage option identifiers. The method further includes receiving a media usage request of a second media item owner. The media usage request identifies the first media item and a selected media usage option of the one or more media usage options. The method further includes, upon determining that the media usage request satisfies one or more criteria pertaining to the selected media usage option, generating a media usage token. The media usage token is based on the media usage request and the selected media usage option. The method further includes transmitting the media usage token to a user device of the second media item owner to authorize the second media item owner to include at least a portion of the first media item in a second media item of the second media item owner.

In some embodiments, the method further includes tracking usage of the first media item in relation to the media usage token and the second media item of the second media item owner. The method may further include receiving payment by the second media item owner according to the selected media usage option and based on the tracked usage.

In some embodiments, the one or more criteria pertaining to the selected media usage option includes at least one of payment of a fee or approval of the media usage request by the first media item owner. In some embodiments, the selected media usage option has an associated payment scheme including at least one of a one-time payment amount, an amount per interaction with the second media item, an amount per interaction with the first media item within the second media item, or a percentage of total revenue earned by the second media item owner in relation to the second media item.

In some embodiments, the method further includes receiving a public universal resource locator (URL) associated with the second media item. The method may further include accessing the public URL associated with the second media item after an expiration of the media usage token. The method may further include responsive to the second media item being publicly accessible after the expiration of the media usage token, automatically renewing the media usage request.

In some embodiments, the media usage token is a smart contract based on a distributed ledger technology. In some embodiments, the method further includes locating a third media item of a third media item owner that includes the first media item. The method may further include transmitting a media usage proposal to the third media item owner.

In another aspect, a computing system includes a memory and one or more processors, coupled to the memory, to generate a first media item identifier for a first media item of a first media item owner. The first media item is associated with one or more media usage options provided by the first media item owner. The one or more processors are further to generate, for each of the one or more media usage options, a media usage option identifier. The one or more processors are further to store the first media item identifier and the one or more media usage option identifiers. The one or more processors are further to receive a media usage request of a second media item owner. The media usage request identifies the first media item and a selected media usage option of the one or more media usage options. The one or more processors are further to, upon determining that the media usage request satisfies one or more criteria pertaining to the selected media usage option, generate a media usage token based on the media usage request and the selected media usage option.

In some embodiments, the one or more processors are further to track usage of the first media item in relation to the media usage token and the second media item of the second media item owner. The one or more processors may be further to receive payment by the second media item owner according to the selected media usage option and based on the tracked usage.

In some embodiments, the one or more criteria pertaining to the selected media usage option includes at least one of payment of a fee or approval of the media usage request by the first media item owner. In some embodiments, the selected media usage option has an associated payment scheme comprising at least one of a one-time payment amount, an amount per interaction with the second media item, an amount per interaction with the first media item within the second media item, or a percentage of total revenue earned by the second media item owner in relation to the second media item.

In some embodiments, the one or more processors are further to receive a public universal resource locator (URL) associated with the second media item. The one or more processors may be further to access the public URL associated with the second media item after an expiration of the media usage token. The one or more processors may be further to responsive to the second media item being publicly accessible after the expiration of the media usage token, automatically renew the media usage request.

In some embodiments, the media usage token is a smart contract based on a distributed ledger technology. In some embodiments, the one or more processors are further to locate a third media item of a third media item owner that includes the first media item. The one or more processors may further transmit a media usage proposal to the third media item owner.

In another aspect, a non-transitory machine-readable storage medium stores instructions which, when executed, cause a processing device to perform operations including generating a first media item identifier for a first media item of a first media item owner. The first media item is associated with one or more media usage options provided by the first media item owner. The operations further include generating, for each of the one or more media usage options, a media usage option identifier. The operations further include storing the first media item identifier and the one or more media usage option identifiers. The operations further include receiving a media usage request of a second media item owner. The media usage request identifies the first media item and a selected media usage option of the one or more media usage options. The operations further include, upon determining that the media usage request satisfies one or more criteria pertaining to the selected media usage option, generating a media usage token based on the media usage request and the selected media usage option. The operations further include transmitting the media usage token to a user device of the second media item owner to authorize the second media item owner to include at least a portion of the first media item in a second media item of the second media item owner.

In some embodiments, the operations further include tracking usage of the first media item in relation to the media usage token and the second media item of the second media item owner. The operations further include receiving payment by the second media item owner according to the selected media usage option and based on the tracked usage.

In some embodiments, the one or more criteria pertaining to the selected media usage option includes at least one of payment of a fee or approval of the media usage request by the first media item owner.

In some embodiments, the selected media usage option has an associated payment scheme including at least one of a one-time payment amount, an amount per interaction with the second media item, an amount per interaction with the first media item within the second media item, or a percentage of total revenue earned by the second media item owner in relation to the second media item.

In some embodiments, the operations further include receiving a public universal resource locator associated with the second media item. The operations further include accessing the public URL associated with the second media item after an expiration of the media usage token. The operations further include responsive to the second media item being publicly accessible after the expiration of the media usage token, automatically renewing the media usage request. In some embodiments, the media usage token is a smart contract based on a distributed ledger technology.

Optional features of one aspect may be combined with other aspects where appropriate.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Media item owners (e.g., content creators) often want to include media item(s) (e.g., audio, video, images, or the like) from other media item owners in their own media items. For example, a first media item owner may use a song created by another media item owner as background music in a video created by the first media item owner. Including the media item(s) from the second media item owner in the first media item owner's new media item may violate rights of the second media item owner. Negotiating traditional media usage agreements (e.g., licensing agreements) can be expensive and is often infeasible for many media item owners. Furthermore, content sharing platforms have to employ tools dedicated to identifying potential violations of rights of media item owners and addressing these violations. These tools usually use content analysis and other similar techniques that consume significant computing resources of the content sharing platform and do not always produce an accurate result.

Aspects of the present disclosure address these inefficiencies by providing methods and systems for authorizing media usage agreements between media item owners. In some embodiments, a first media item owner (e.g., a licensor) that wants to grant media usage rights (e.g., a license) to a media item may upload the media item to a media usage rights platform. The first media item owner may specify one or more media usage (e.g., licensing) options for the media item. A media usage option may have an associated payment scheme. For example, the first media item owner may require that, in return for including at least a portion of their media item in a media item of a second media item owner (e.g., a licensee), the second media item owner pay a one-time fee, a certain amount per user interaction (e.g., view, listen, stream, or the like) with the second media item owner's media item, or a certain percentage of total revenue that the second media item owner receives in relation to the second media item owner's media item. In some embodiments, the first media item owner may require that the second media item owner pay a certain amount only if there is a user interaction with the first media item owner's media item within the second media item owner's media item. For example, a licensee may request a license to use a licensor's video in part of a new video created by the licensee. If the licensor's video starts at minute 10 of the licensee's video and a user only interacts with (e.g., watches) the first 5 minutes of the licensee's video, the licensee may not be required to make any payment to the licensor under the terms of the media usage agreement.

A media usage option may have restrictions or conditions on resale. For example, in some embodiments, a media usage option may not allow a second media item owner to obtain a media usage token and then sell the media usage token to a third media item owner. In some embodiments, a media usage option may allow a second media item owner to sell their media usage token to a third media item owner conditioned on the first media item owner receiving a portion (e.g., a predetermined percentage, a specific amount) of the gross sale amount. In some embodiments, a second media item owner may be able to sell a portion of the usage rights of their media usage token, such that their usage rights are reduced while increasing the usage rights of a third media item owner. For example, if a second media item owner selected a media usage option that authorized 10,000 interactions with the second media item owner's media item (which contains at least a portion of the first media item owner's media item), the second media item owner may be able to sell 5,000 interactions with the second media item owner's media item to a third media item owner. The second media item owner would be left with authorization from the first media item owner for 5,000 interactions with their media item.

A media usage option may include information associated with a financial account of the first media item owner. The payment scheme of the media usage option may require the second media item owner to transfer payment directly to the financial account of the first media item owner. The financial account may be a bank account, an escrow account, a cryptocurrency account, or some other financial account that can receive payment from a second media item owner.

Once the media item and associated media usage options are uploaded to the media usage rights platform, an identifier (e.g., hash) may be generated for the media item and each of the media usage options. The media item identifier and the media usage option identifier(s) may then be stored in a database (e.g., a relational database, a non-relational database). In some embodiments, the identifiers may be stored in a distributed ledger (e.g., blockchain). In some embodiments, the distributed ledger may be immutable and/or made accessible to the public. A public distributed ledger may facilitate accounting tasks and may help resolve disputes. In some embodiments, identifiers for media items are stored in a distributed ledger while identifiers for media usage options are stored in a database. In some embodiments, the media item identifier is a unique identifier that identifies the media item.

A second media item owner ("licensee") may be able to search for the first media item owner's media item ("first media item") based on attributes of the first media item. For example, the second media item owner may search for the first media item by name, tag, media item type, or the like. Alternatively, the second media item owner may search for media items based on attributes of the media usage options associated with each media item. In some embodiments, the second media item owner may search for media items using a combination of media item attributes and media usage option attributes. In some embodiments, a second media item owner may be able to search for the first media item by uploading all or part of the first media item to the content licensing platform (e.g., reverse search). The media usage rights platform may provide a list of results to the second media item owner that match the search criteria. The second media item owner may then select a media item and view the associated media usage options. The second media item owner may submit a media usage request by selecting a media item and one of the associated media usage options. The media usage request may be stored. Upon determining that the media usage request satisfies one or more criteria pertaining to the selected media usage option, a media usage token may be generated based on the media usage request and the selected media usage option. In some embodiments, the selected media usage option may require, as a criterion of the one or more criteria, that the second media item owner pay a fee (e.g., a licensing fee). In some embodiments, the selected media usage option may require, as a criterion (e.g., prior to generating the media usage token), that the media usage request be approved by the first media item owner (e.g., the licensor).

In some embodiments, the media usage token may be a smart contract based on a distributed ledger technology (e.g., Ethereum, Solana, etc.). The smart contract may include an escrow feature that requires that funds be provided by the second media item owner (e.g., the licensee). Those funds may be automatically dispersed to the appropriate party (e.g., media usage rights platform, licensor, etc.) according to the terms of the selected media usage option. The media usage token may have an associated expiration condition based on the selected media usage option. For example, the media usage token may expire after a certain number of user interactions with the licensee's media item, after a certain number of user interactions with the licensor's media item in the licensee's media item, or after a predetermined duration of time.

In some embodiments, the second media item owner may be required to provide the media usage token along with their media item when the second media item owner submits their media item to a content sharing platform. In some embodiments, the second media item owner may provide a unique identifier of the media usage token instead of the media usage token itself. The media usage rights platform may track usage of the first media item owner's media item in relation to the second media item owner's media usage token and the second media item owner's media item. The media usage rights platform may receive from the second media item owner payment according to the terms (e.g., payment scheme) of the selected media usage option. In some embodiments, the media usage rights platform sends a request for payment (e.g., invoice) to the second media item owner. In some embodiments, the media usage request was submitted with a corresponding account (e.g., escrow account, deposit account) that payments can be taken from according to the terms of the selected media usage option. After receiving payment from the second media item owner, the media usage rights platform may then distribute some or all of the received payment to the first media item owner. In some embodiments, payment transactions are handled by a payment processor on behalf of the media usage rights platform.

In some embodiments, the media usage rights platform may require the second media item owner to provide a public universal resource locator (URL) where the second media item owner's media item that incorporates the first media item owner's media item can be accessed. After the second media item owner's media usage token has expired, the media usage rights platform may access the public URL of the second media item owner's media item to determine if the second media item owner's media item is still publicly accessible. In some embodiments, if the second media item owner's media item is accessible after the second media item owner's media usage token has expired, the media usage rights platform may automatically renew the second media item owner's media usage request and associated media usage token according to the terms of the original media usage request.

In some embodiments, a media item created by a third media item owner that includes at least a portion of the first media item owner's media item may be located (e.g., on a content sharing platform). If the media usage rights platform determines that the third media item owner does not have a valid media usage token associated with the second media item owner's media item, the media usage rights platform may send a media usage proposal to the third media item owner. The media usage proposal may include one or more media usage options associated with the first media item owner's media item. Upon acceptance of the media usage proposal by the third media item owner, the media usage rights platform may provide a media usage token to the third media item owner. In some embodiments, the media usage rights platform may require the third media item owner to provide payment based on the use of the second media item owner's media item before the media usage token was granted.

In some embodiments, the media usage rights platform may expose an application programming interface (API) that allows content sharing platforms to interact with the media usage rights platform. For example, a content sharing platform may allow a media item owner to upload a media item to the content sharing platform and specify one or more media usage options associated with the media item. The content sharing platform may then transmit, via the API, the media item and media usage options to the media usage rights platform. In some embodiments, a content sharing platform may allow a media item owner to submit a media usage request for a specific media item to the media usage rights platform while the media item owner is interacting with the media item on the content sharing platform. In some embodiments, a content sharing platform may track user interactions with media items that have a corresponding media usage token (e.g., licensed media items) and transmit, via the API, interaction statistics to the media usage rights platform. For example, a content sharing platform may notify the media usage rights platform when a licensed media item is viewed or listened to. The content sharing platform may require a media item owner that is uploading a media item that includes one or more licensed media items to include the media usage token(s) associated with the licensed media item(s) on the content sharing platform.

In some embodiments, if a media usage token is included with a media item on a content sharing platform, the content sharing platform may check, via the API of the media usage rights platform, the status of the media usage token. For example, if, when the content sharing platform checks the status of the media usage token, the media usage token is expired, the content sharing platform may prevent users from interacting with the media item that has the expired media usage token.

In some embodiments, the content licensing platform may allow the license fee to be passed onto consumers of the media item instead of being paid by the licensor media item owner. For example, a media item owner may license a media item with an agreement to pay a certain amount for each user interaction with the licensed media item. The licensor may then upload, along with their media usage token, their new media item (which includes the licensed media item) to a content sharing platform. The content sharing platform may require users agree to pay an amount that satisfies the media usage agreement before they can interact with the licensor's media item.

Accordingly, aspects of the present disclosure provide mechanisms to facilitate media usage agreements between media item owners and to track enforcement of such agreements. As a result, the workflow within the content sharing platform is improved and fewer computing resources of the content sharing platform are consumed on the detection and prevention of possible violations of rights of media items owners. Accordingly, more computing resources are made available to other processes of the content sharing platform, which can increase an overall efficiency and decrease an overall latency of the content sharing platform.

Figure 1:
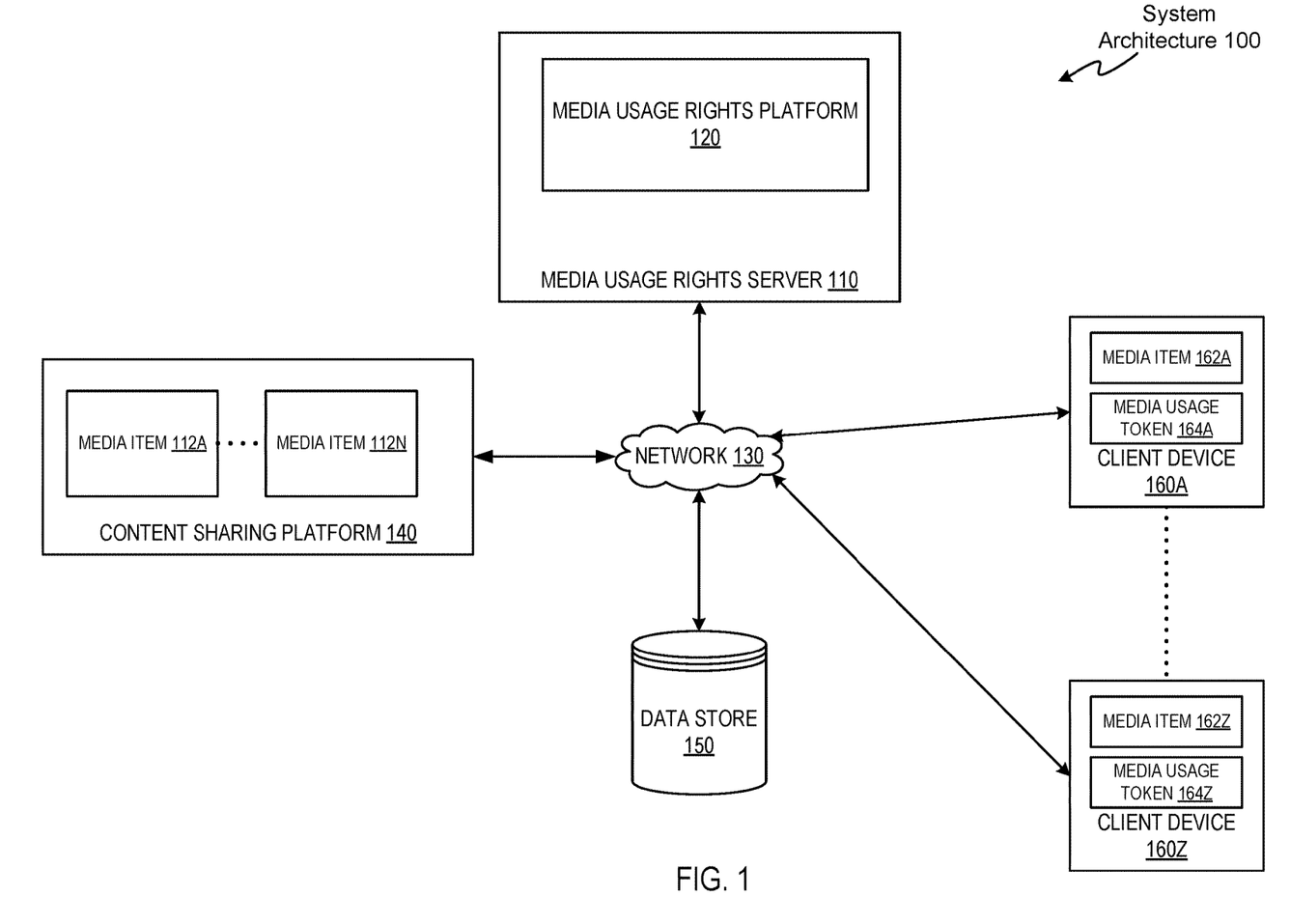
FIG. 1 illustrates an example system architecture for authorizing media usage agreements between content creators, according to some embodiments.

FIG. 1 illustrates an example system architecture 100 for authorizing media usage agreements between content creators, according to some embodiments. System architecture 100 includes media usage rights server 110, content sharing platform 140, data store 150, network 130, and client devices 160A-Z.

Content sharing platform 140 may include one or more servers and can enable users to consume, upload, share, search for, approve of ("like"), dislike, and/or comment on media items 112A-N (referred to generally as "media item 112" herein). Content sharing platform 140 may include a website (e.g., a webpage) or application back-end software used to provide a user with access to media items (e.g., via client device 160). A media item can be consumed via the Internet or via a mobile application on client device 160. A media item can correspond to a media file (e.g., a video file, and audio file, etc.) or a portion of a media file (e.g., a portion or a chunk of a video file, an audio file, etc.). As used herein, "media," media item," "online media item," "digital media," "digital media item," "content," and "content item" can include an electronic file that can be executed or loaded using software, firmware or hardware configured to present the digital media item to an entity. In some embodiments, media item 112 is a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips or any set of animated images to be displayed in sequence. In some embodiments, a video item can be stored (e.g., at data store 150) as a video file that includes a video component and an audio component. The video component can include video data that corresponds to one or more sequential video frames of the video item. The audio component can include audio data that corresponds to the video data.

Media usage rights server 110 may include media usage rights platform 120. Media usage rights server 110 may be a rackmount server, a router computer, a server computer, a personal computer, a mainframe computer, a laptop computer, a tablet computer, a desktop computer, or the like. Media usage rights server 110 may be part of the content sharing platform 140 or part of another system. In some embodiments, media usage rights server 110 may be connected to data store 150 via network 130, which may be a public network (e.g., the Internet), a private network (e.g., a local area network (LAN)), a wide area network (WAN), a wired network (e.g., Ethernet network), a wireless network (e.g., an 802.11 network), a cellular network (e.g., a Long Term Evolution (LTE) network), and/or a combination thereof. In some embodiments, data store 150 may be a part of media usage rights server 110.

Data store 150 may reside in memory (e.g., random access memory), cache, drives (e.g., hard drive, solid state drive), flash drives, etc., and may be part of one or more database systems, one or more file systems, one or more distributed ledgers, or another type of component or device capable of storing data. Data store 150 may include multiple storage components (e.g., multiple drives or multiple databases) that may also span multiple computing devices (e.g., multiple server computers). Data store 150 may be persistent storage that is capable of storing data. A persistent storage may be a local storage unit or a remote storage unit, electronic storage units (e.g., main memory), or a similar storage unit. Persistent storage may be a monolithic device or a distributed set of devices.

Client devices 160A-Z may include devices, such as televisions, smart phones, personal digital assistants, portable media players, laptop computers, electronic book readers, tablet computers, desktop computers, gaming consoles, set-top boxes, or the like. Client devices 160A-Z may each include a media item 162A-Z and/or a media usage token 164A-Z. Client device 160A may correspond to a licensor, a licensee, a content sharing platform user, or another user. If client device 160A corresponds to a licensor, media item 162A may be a media item created by the licensor. Client device 160A may upload media item 162A to content sharing platform 140 or media usage rights server 110 via network 130. Client device 160A may also upload media usage options (not shown) corresponding to media item 162A. If client device 160A corresponds to a licensee, media item 162A may be a media item created by the licensee that includes a licensed media item created by a licensor. Media usage token 164A may correspond to the media item created by the licensor. Examples of media items 162A-Z may include, and are not limited to, digital video, digital movies, animated images, digital photos, digital music, digital audio, digital video games, collaborative media content presentations, website content, social media updates, electronic books, electronic journals, digital audio books, web blogs, software applications, etc.

In general, functions described in implementations as being performed by content sharing platform 140 and/or media usage rights server 110 can also be performed on the client devices 160 in other implementations, if appropriate. In addition, the functionality attributed to a particular component can be performed by different or multiple components operating together. Content sharing platform 140 and/or media usage rights server 110 can also be accessed as a service provided to other systems or devices through appropriate application programming interfaces, and thus is not limited to use in websites.

It should be noted that although some embodiments of the present disclosure are directed to a content sharing platform, embodiments of this disclosure can be applied to other types of platforms. For example, embodiments of the present disclosure can be applied to a content archive platform, a content storage platform, etc.

In implementations of the disclosure, a "user" or an "owner" can be represented as a single individual. However, other implementations of the disclosure encompass a "user" or an "owner" being an entity controlled by a set of users and/or an automated source. For example, a set of individual users or owners federated as a community in a social network can be considered a "user" or an "owner". In another example, an automated consumer can be an automated ingestion pipeline, such as a topic channel, of the content sharing platform 140 or the media usage rights server 110.

In situations in which the systems discussed here collect personal information about users (including owners), or can make use of personal information, the users can be provided with an opportunity to control whether the content sharing platform 140 or the media usage rights server 110 collects user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the content sharing platform 140 or the media usage rights server 110.

Figure 2:
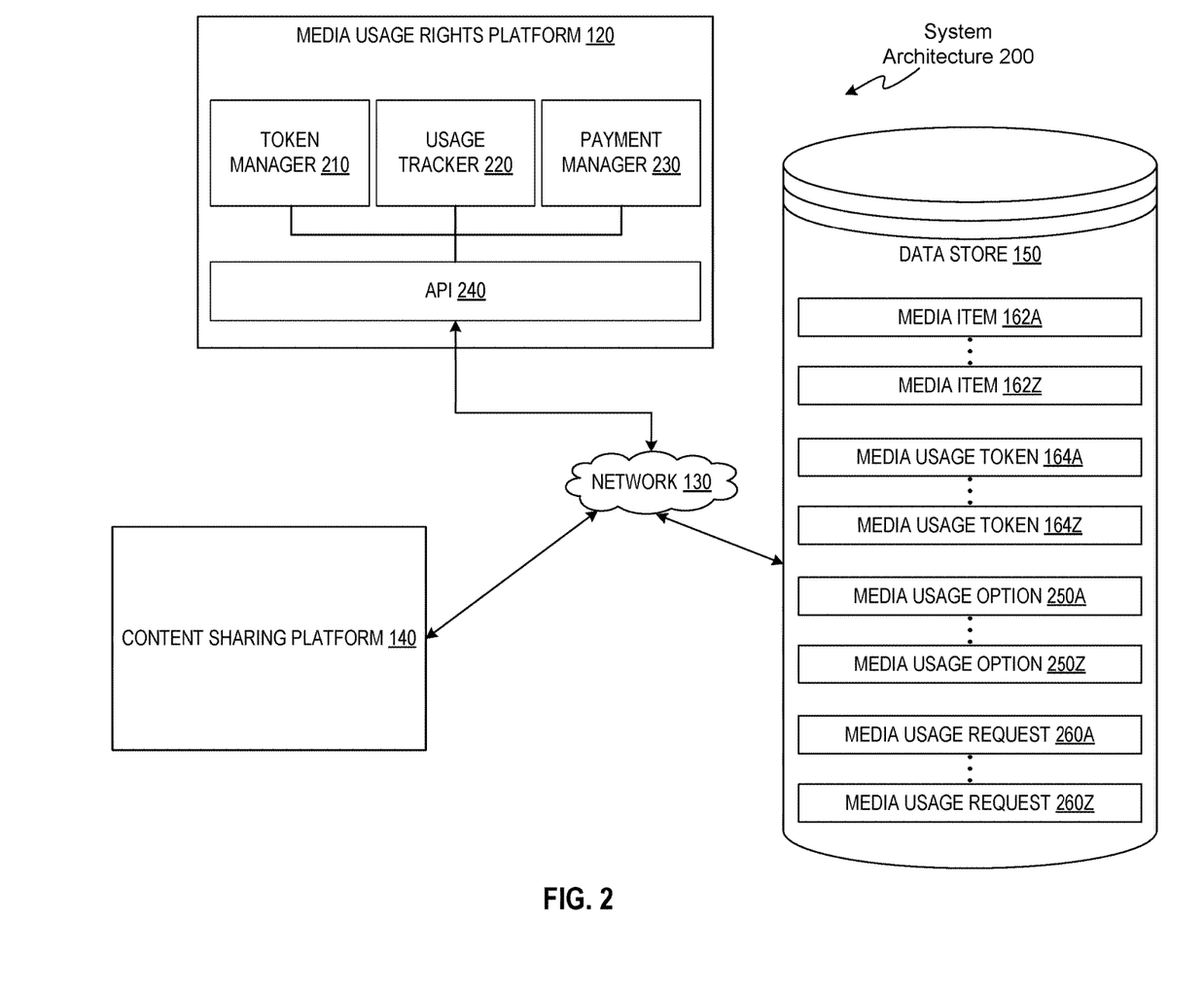
FIG. 2 illustrates an example system architecture for authorizing media usage agreements between content creators, according to some embodiments.

FIG. 2 illustrates an example system architecture 200 for authorizing media usage agreements between content creators, according to some embodiments. Media usage rights platform 120 may include token manager 210, usage tracker 220, payment manager 230, and application programming interface (API) 240. Token manager 210 may generate media usage tokens based on media usage requests. Token manager 210 may store the media usage tokens in data store 150 (e.g., media usage token 164A-Z). Each media usage token may have a corresponding unique identifier. Token manager 210 may store attributes of the media usage tokens. For example, each media usage token may have attributes including an associated media item owner (e.g., content creator), an associated media item, an associated media usage option with an associated payment scheme, an expiration condition, and a status. The status may indicate whether the media usage token is valid or expired. The attributes of the media usage token may be stored in data store 150 along with the media usage token.

In some embodiments, token manager 210 may also process media items, media usage options, and media usage requests. For example, token manager 210 may receive from a media item owner a media item (e.g., media item 162A) with one or more associated media usage options (e.g., media usage option 250A-Z). Token manager 210 may generate an identifier for the media item and each media usage option. Token manager 210 may store the media item (e.g., media item 162A-Z) in data store 150 and/or the corresponding identifier along with the media usage option(s) (e.g., media usage option 250A-Z) and/or their identifiers. Upon receiving a media usage request (e.g., media usage request 260A-Z), token manager 210 may store the media usage request (and/or an identifier of the media usage request) in data store 150. As mentioned above, data store 150 may be a relational database, non-relational database, distributed ledger, another form of persistent storage, or any combination thereof.

Usage tracker 220 may monitor usage of media usage tokens and licensed media items. For example, if the payment scheme corresponding to a media usage token depends on interactions with a licensee's media item, usage tracker 220 may track a number of user interactions with the licensee's media item. In some embodiments, usage tracker 220 may receive interaction statistics (e.g., number of user interactions) from a content sharing platform. In some embodiments, usage tracker 220 may monitor a publicly accessible universal resource locator (URL) associated with the licensee's media item. For example, if a media usage token has a predetermined duration of time as an expiration condition, usage tracker 220 may attempt to access the publicly accessible URL after the predetermined duration of time has passed since the media usage token was created (e.g., after the media usage token has expired). In some embodiments, if the media item is still publicly accessible after an expiration of the media usage token, the media usage request may be automatically renewed.

In some embodiments, a media usage token may have as an expiration condition a number of interactions with the licensee's media item. In some embodiments, a media usage token may have as an expiration condition a number of interactions with the licensor's media item within the licensee's media item. If a media usage token has an expiration condition based on a number of interactions (e.g., interactions of users of a content sharing platform), usage tracker 220 may mark the media usage token expired (e.g., change the status attribute of the media usage token to "expired") after the number of interactions with the licensee's media item exceeds the threshold specified in the expiration condition.

Payment manager 230 may receive payments by media item owners in relation to media usage tokens. For example, if a media option requires payment of a fee (e.g., licensing fee) before generating a media usage token, payment manager 230 may send a payment request (e.g., invoice) to the media item owner requesting the media usage token. Upon receiving the completed payment, payment manager 230 may signal token manager 210 to generate the media usage token for the media item owner. Payment manager 230 may also receive and/or request payments by media item owners after the media item owner has received a media usage token. For example, if the payment scheme associated with the media usage token requires payment based on a number of user interactions, payment manager 230 may request periodic (e.g., daily, weekly, monthly, or the like) payments from the media item owner based on the number of interactions reported by usage tracker 220. In some embodiments, payment manager 230 may be able to automatically withdraw funds from an account (e.g., bank account, credit account, debit account, cryptocurrency account) associated with the media item owner according to the payment scheme of the media usage option selected by the media item owner.

API 240 may interact with token manager 210, usage tracker 220, and payment manager 230. In some embodiments, API 240 may allow other platforms (e.g., content sharing platform 140) to interact with media usage rights platform 120. For example, content sharing platform 140 may use API 240 to send user interaction statistics related to a media item to media usage rights platform 120. In some embodiments, content sharing platform 140 may use API 240 to allow a media item owner to submit a media item and corresponding media usage options to media usage rights platform 120 while using content sharing platform 140.

Figure 3A:
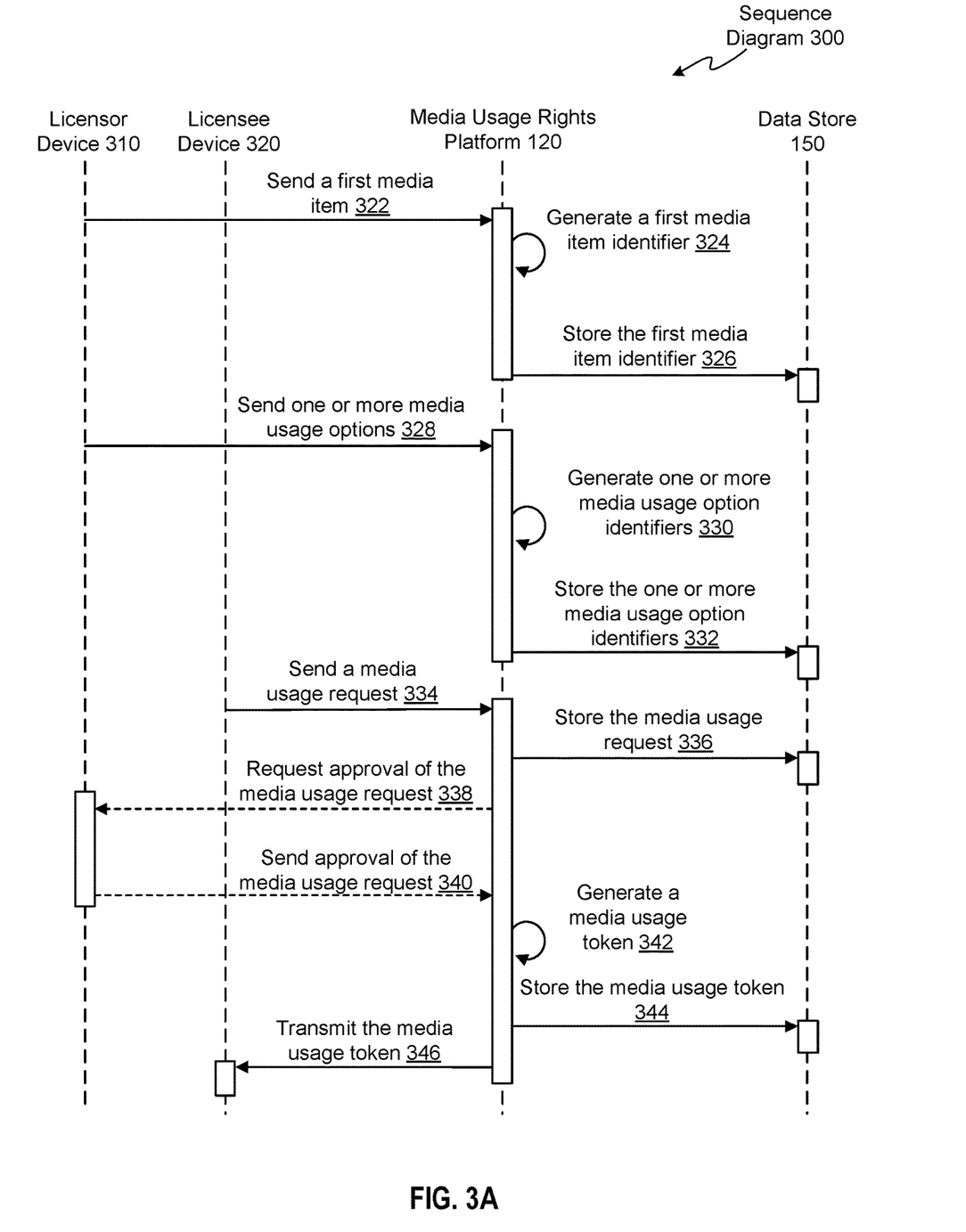
FIG. 3A is a sequence diagram for authorizing media usage agreements between content creators, according to some embodiments.

FIG. 3A is a sequence diagram 300 for authorizing media usage agreements between content creators, according to some embodiments. Licensor device 310 may correspond to a user device of a first media item owner, and licensee device 320 may correspond to a user device of a second media item owner. Licensor device 310 may send (322) a first media item to media usage rights platform 120. Media usage rights platform 120 may generate (324) a first media item identifier. Media usage rights platform 120 may store (326) the first media item identifier in data store 150. Licensor device 310 may send (328) one or more media usage options to media usage rights platform 120. Media usage rights platform 120 may generate (330) one or more media usage option identifiers, and then may store (332) the one or more media usage option identifiers in data store 150. Licensee device 320 may send (334) a media usage request to media usage rights platform 120. Media usage rights platform 120 may store (336) the media usage request in data store 150. In some embodiments, media usage rights platform 120 may request (338) approval of the media usage request from licensor device 310. Licensor device 310 may send (340) approval of the media usage request to media usage rights platform 120. Media usage rights platform 120 may then generate (342) a media usage token. In some embodiments, media usage rights platform 120 may request payment of a fee from licensee device 320 before generating a media usage token. Media usage rights platform 120 stores (344) the media usage token in data store 150. Media usage rights platform transmits (346) the media usage token to licensee device 320.

Figure 3B:
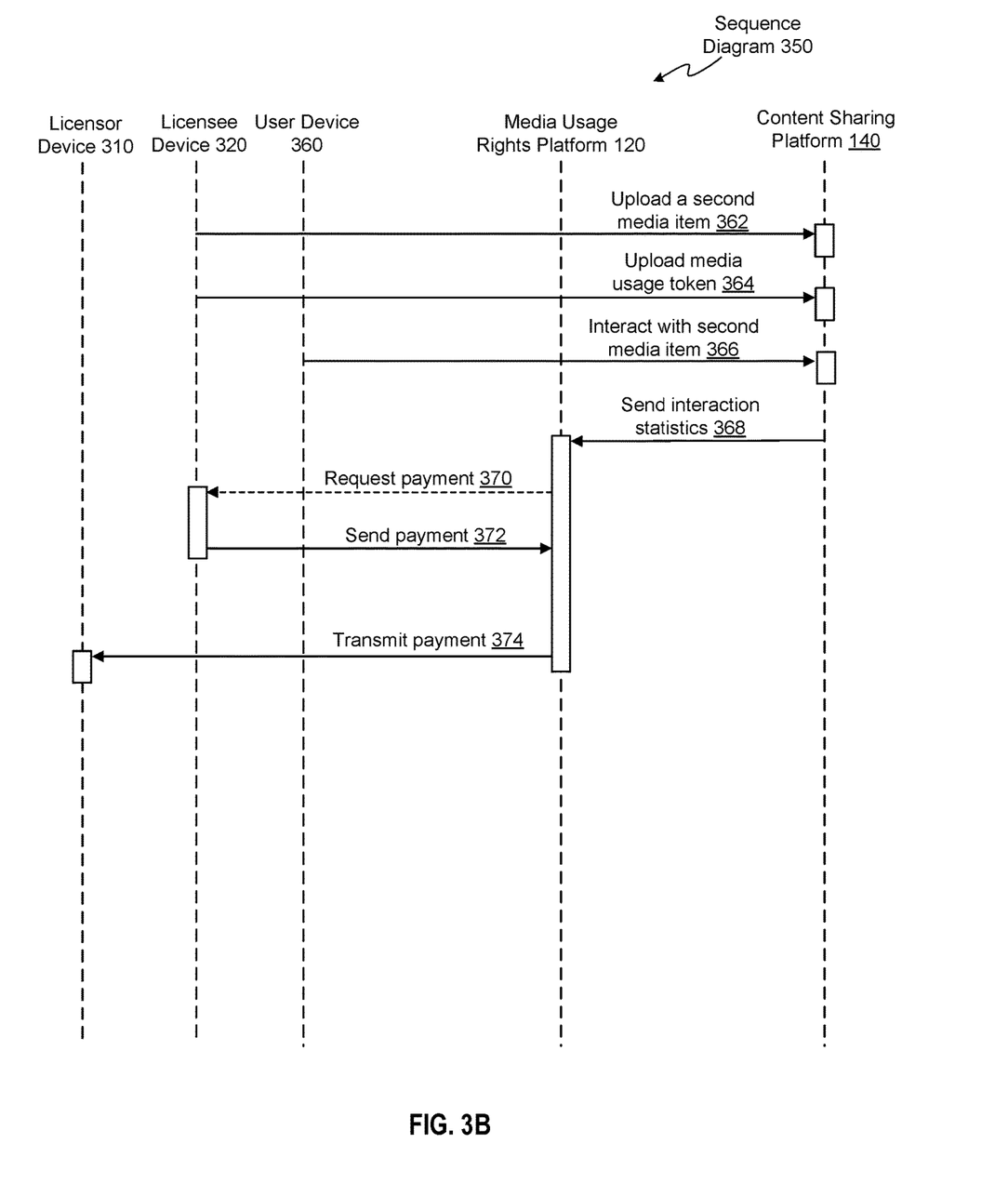
FIG. 3B is a sequence diagram for authorizing media usage agreements between content creators, according to some embodiments.

FIG. 3B is a sequence diagram 350 for authorizing media usage agreements between content creators, according to some embodiments. User device 360 may correspond to a user device of a user that interacts with media items (e.g., a user of a content sharing platform). Licensee device 320 may upload (362) a second media item to content sharing platform 140. Licensee device 320 may upload (364) a media usage token to content sharing platform 140. User device 360 may interact (366) with the second media item. Content sharing platform 140 may send (368) interaction statistics related to the second media item and the media usage token to media usage rights platform 120 (e.g., via API 240). In some embodiments, media usage rights platform 120 may request (370) payment from licensee device 320. Licensee device 320 may send (372) payment to media usage rights platform 120. Media usage rights platform 120 may transmit (374) payment to licensor device 310.

Figure 4:
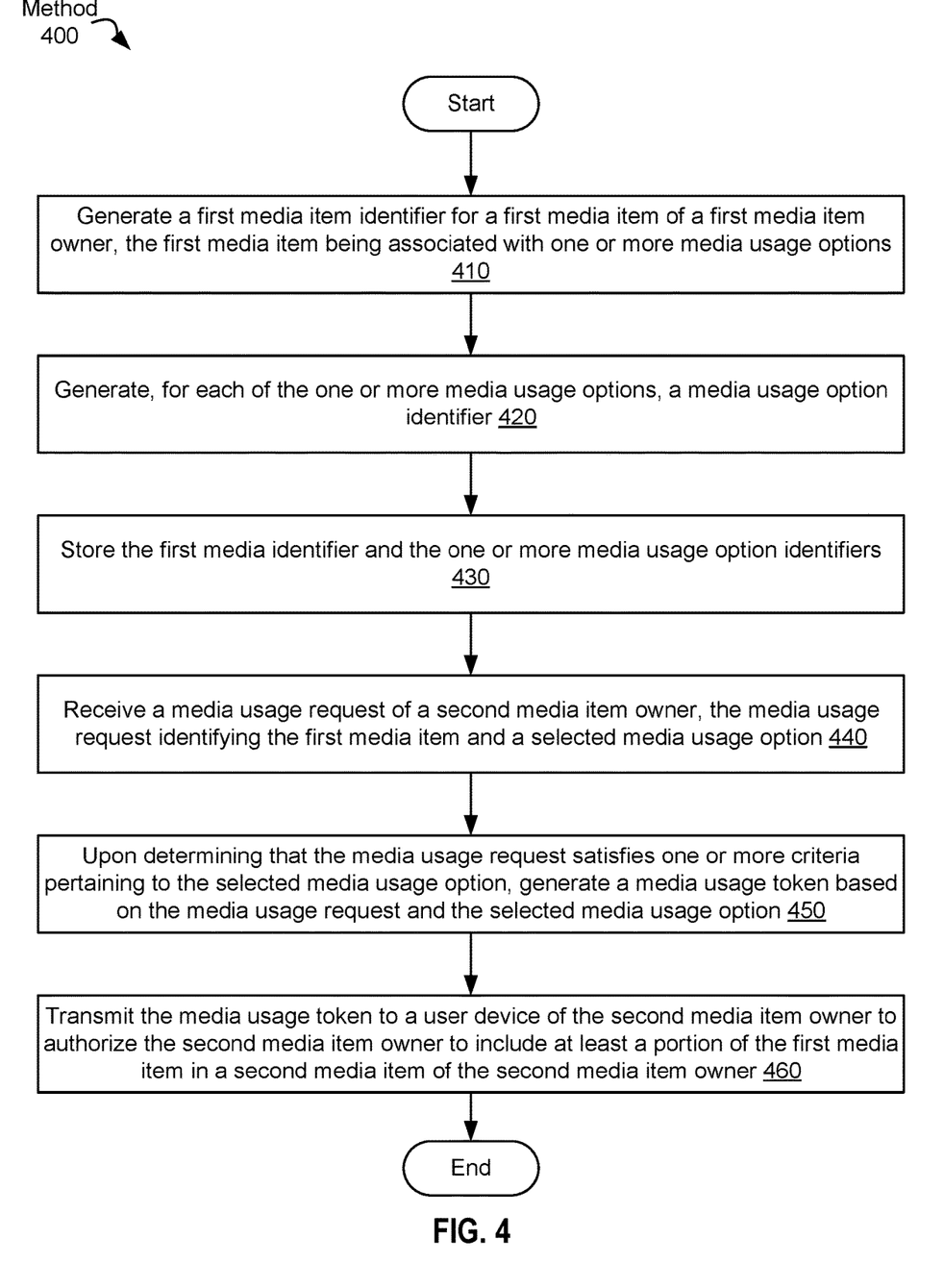
FIG. 4 is a flow diagram illustrating an example method of authorizing media usage agreements between content creators, according to some embodiments.

FIG. 4 is a flow diagram illustrating an example method 400 of authorizing media usage agreements between content creators, according to some embodiments. Method 400 may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 400 may be performed, in part, by media usage rights server 110 and/or client device 160A-Z of FIG. 1. In some embodiments, a non-transitory machine-readable storage medium stores instructions that when executed by a processing device (e.g., of media usage rights server 110) cause the processing device to perform method 400.

For simplicity of explanation, method 400 is depicted and described as a series of operations. However, operations in accordance with this disclosure can occur in various orders and/or concurrently and with other operations not presented and described herein. Furthermore, not all illustrated operations may be performed to implement method 400 in accordance with the disclosed subject matter. In addition, those skilled in the art will understand and appreciate that method 400 could alternatively be represented as a series of interrelated states via a state diagram or events.

Referring to FIG. 4, at block 410, the processing logic implementing method 400 may generate a first media item identifier for a first media item of a first media item owner, the first media item being associated with one or more media usage options. At block 420, processing logic may generate, for each of the one or more media usage options, a media usage option identifier. At block 430, processing logic may store the first media identifier and the one or more media usage option identifiers. At block 440, processing logic may receive a media usage request of a second media item owner, the media usage request identifying the first media item and a selected media usage option. At block 450, upon determining that the media usage request satisfies one or more criteria pertaining to the selected media usage option, processing logic may generate a media usage token based on the media usage request and the selected media usage option. At block 460, processing logic may transmit the media usage token to a user device of the second media item owner to authorize the second media item owner to include at least a portion of the first media item in a second media item of the second media item owner.

Figure 5:
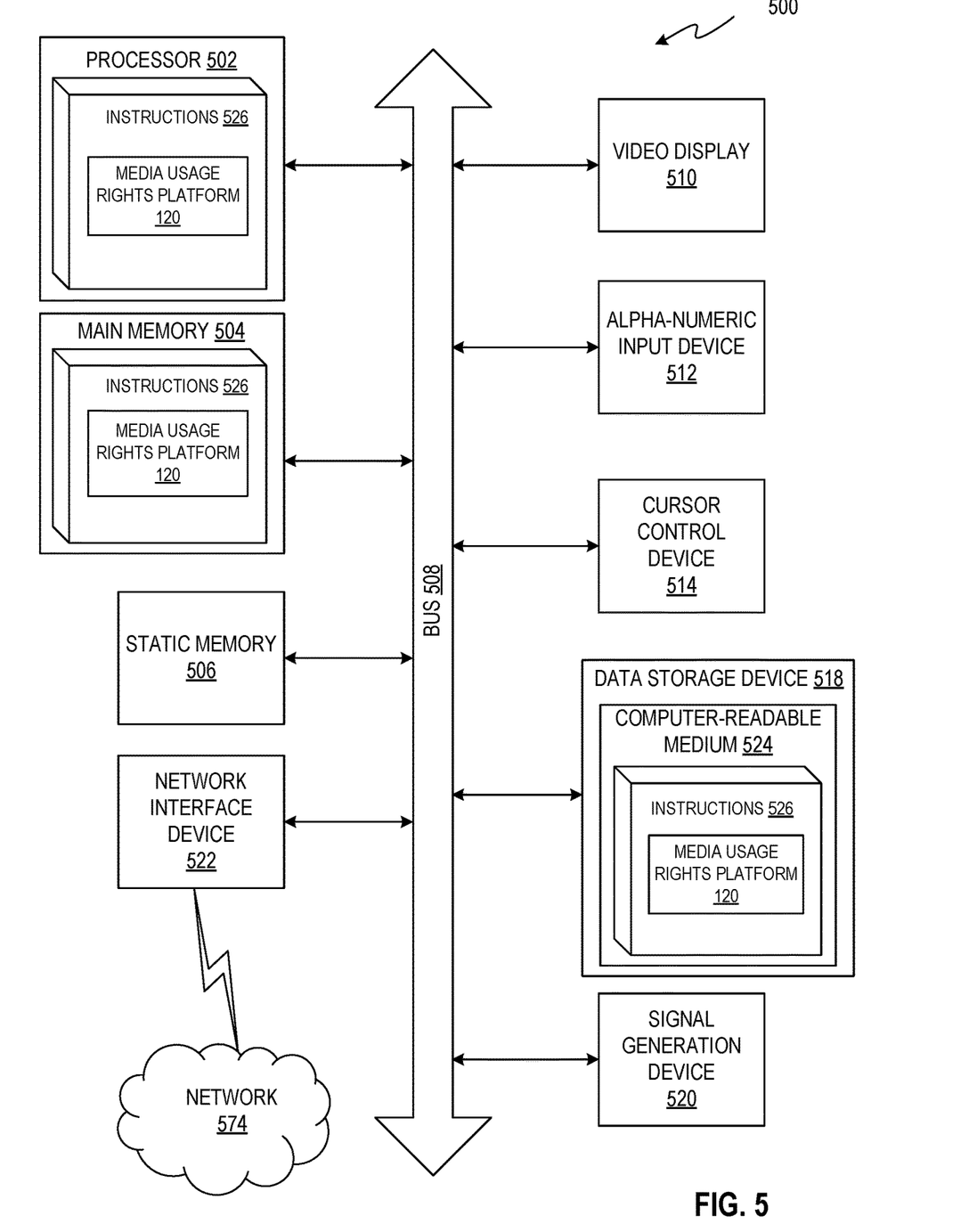
FIG. 5 is a block diagram illustrating an exemplary computer system, in accordance with implementations of the present disclosure.

FIG. 5 is a block diagram illustrating an exemplary computer system 500, in accordance with implementations of the present disclosure. In some embodiments, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., Random Access Memory (RAM)), a non-volatile memory 506 (e.g., Read-Only Memory (ROM) or Electrically-Erasable Programmable ROM (EEPROM)), and a data storage device 518, which may communicate with each other via a bus 508.

Processing device 502 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 500 may further include a network interface device 522 (e.g., coupled to network 574). Computer system 500 also may include a video display unit 510 (e.g., an LCD), an alphanumeric input device 512 (e.g., a keyboard), a cursor control device 514 (e.g., a mouse), and a signal generation device 520.

In some embodiments, data storage device 518 may include a non-transitory computer-readable storage medium 524 (e.g., non-transitory machine-readable medium) on which may store instructions 526 encoding any one or more of the methods or functions described herein, including instructions encoding components of FIG. 1 and/or FIG. 2 (e.g., media usage rights platform 120, token manager 210, usage tracker 220, payment manager 230, etc.) and for implementing methods described herein.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing." "providing," "obtaining," "causing," "accessing," "determining," "adding." "using," "training," "reducing," "generating," "correcting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

Reference throughout this specification to "one implementation," or "an implementation," means that a particular feature, structure, or characteristic described in connection with the implementation is included in at least one implementation. Thus, the appearances of the phrase "in one implementation." or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interactions between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method comprising:
   generating a first media item identifier for a first media item of a first media item owner, the first media item being associated with one or more media usage options provided by the first media item owner, wherein each media usage option defines rights for incorporating a portion of the first media item into new media items created by other media item owners;
   generating, for each of the one or more media usage options, a media usage option identifier;
   storing the first media item identifier and the one or more media usage option identifiers;
   receiving a media usage request of a second media item owner to authorize incorporation of a designated portion of the first media item into a second media item being created by the second media item owner, the media usage request identifying the first media item and a selected media usage option of the one or more media usage options;
   upon determining that the media usage request satisfies one or more criteria pertaining to the selected media usage option, generating a media usage token based on the media usage request and the selected media usage option, wherein the media usage token is subject to an expiration condition based on the selected media option;
   transmitting the media usage token to a user device of the second media item owner to authorize the second media item owner to include at least a portion of the first media item in a second media item of the second media item owner;
   tracking usage of the first media item in relation to the media usage token and the second media item of the second media item owner; and
   receiving payment by the second media item owner according to the selected media usage option and based on the tracked usage.

2. The method of claim 1, wherein the one or more criteria pertaining to the selected media usage option comprises at least one of:
   payment of a fee; or
   approval of the media usage request by the first media item owner.

3. The method of claim 1, wherein the selected media usage option has an associated payment scheme comprising at least one of:
   a one-time payment amount;
   an amount per interaction with the second media item;
   an amount per interaction with the first media item within the second media item; or
   a percentage of total revenue earned by the second media item owner in relation to the second media item.

4. The method of claim 1, further comprising:
   receiving a public universal resource locator (URL) associated with the second media item;

accessing the public URL associated with the second media item after an expiration of the media usage token; and responsive to the second media item being publicly accessible after the expiration of the media usage token, automatically renewing the media usage request.

5. The method of claim 1, wherein the media usage token is a smart contract based on a distributed ledger technology.

6. The method of claim 1, further comprising:

locating a third media item of a third media item owner that comprises the first media item; and transmitting a media usage proposal to the third media item owner.

7. A computing system, comprising:

a memory; and one or more processors, coupled to the memory, to:

generate a first media item identifier for a first media item of a first media item owner, the first media item being associated with one or more media usage options provided by the first media item owner, wherein each media usage option defines rights for incorporating a portion of the first media item into new media items created by other media item owners;

generate, for each of the one or more media usage options, a media usage option identifier;

store the first media item identifier and the one or more media usage option identifiers;

receive a media usage request of a second media item owner to authorize incorporation of a designated portion of the first media item into a second media item being created by the second media item owner, the media usage request identifying the first media item and a selected media usage option of the one or more media usage options;

upon determining that the media usage request satisfies one or more criteria pertaining to the selected media usage option, generate a media usage token based on the media usage request and the selected media usage option, wherein the media usage token is subject to an expiration condition based on the selected media option;

transmit the media usage token to a user device of the second media item owner to authorize the second media item owner to include at least a portion of the first media item in a second media item of the second media item owner;

track usage of the first media item in relation to the media usage token and the second media item of the second media item owner; and receive payment by the second media item owner according to the selected media usage option and based on the tracked usage.

8. The system of claim 7, wherein the one or more criteria pertaining to the selected media usage option comprises at least one of: payment of a fee; or approval of the media usage request by the first media item owner.

9. The system of claim 7, wherein the selected media usage option has an associated payment scheme comprising at least one of:

a one-time payment amount;

an amount per interaction with the second media item;

an amount per interaction with the first media item within the second media item; or a percentage of total revenue earned by the second media item owner in relation to the second media item.

10. The system of claim 7, wherein the one or more processors are further to:

receive a public universal resource locator (URL) associated with the second media item;

access the public URL associated with the second media item after an expiration of the media usage token; and responsive to the second media item being publicly accessible after the expiration of the media usage token, automatically renew the media usage request.

11. The system of claim 7, wherein the media usage token is a smart contract based on a distributed ledger technology.

12. The system of claim 7, wherein the one or more processors are further to:

locate a third media item of a third media item owner that comprises the first media item; and transmit a media usage proposal to the third media item owner.

13. A non-transitory computer-readable storage medium comprising instructions that, when executed by one or more processors, cause the one or more processors to perform operations comprising:

generating a first media item identifier for a first media item of a first media item owner, the first media item being associated with one or more media usage options provided by the first media item owner, wherein each media usage option defines rights for incorporating a portion of the first media item into new media items created by other media item owners;

generating, for each of the one or more media usage options, a media usage option identifier;

storing the first media item identifier and the one or more media usage option identifiers;

receiving a media usage request of a second media item owner to authorize incorporation of a designated portion of the first media item into a second media item being created by the second media item owner, the media usage request identifying the first media item and a selected media usage option of the one or more media usage options;

upon determining that the media usage request satisfies one or more criteria pertaining to the selected media usage option, generating a media usage token based on the media usage request and the selected media usage option, wherein the media usage token is subject to an expiration condition based on the selected media option;

transmitting the media usage token to a user device of the second media item owner to authorize the second media item owner to include at least a portion of the first media item in a second media item of the second media item owner;

tracking usage of the first media item in relation to the media usage token and the second media item of the second media item owner; and receiving payment by the second media item owner according to the selected media usage option and based on the tracked usage.

14. The non-transitory computer-readable storage medium of claim 13, wherein the one or more criteria pertaining to the selected media usage option comprises at least one of:

payment of a fee; or approval of the media usage request by the first media item owner.

15. The non-transitory computer-readable storage medium of claim 13, wherein the selected media usage option has an associated payment scheme comprising at least one of:
  a one-time payment amount;
  an amount per interaction with the second media item;
  an amount per interaction with the first media item within the second media item; or
  a percentage of total revenue earned by the second media item owner in relation to the second media item.

16. The non-transitory computer-readable storage medium of claim 13, wherein the instructions further cause the one or more processors to perform operations comprising:
  receiving a public universal resource locator (URL) associated with the second media item;
  accessing the public URL associated with the second media item after an expiration of the media usage token; and
  responsive to the second media item being publicly accessible after the expiration of the media usage token, automatically renewing the media usage request.

17. The non-transitory computer-readable storage medium of claim 13, wherein the media usage token is a smart contract based on a distributed ledger technology.

* * * * *